N. Petre.

Lock.

No. 3,681. Reissued Oct. 19, 1869.

Witnesses.

Edmund Masson.

Inventor

N. Petre

By Atty A. B. Stoughton

United States Patent Office.

NECOLAS PETRÉ, OF NEW YORK, N. Y.

*Letters Patent No.* 67,213, *dated July* 30, 1867; *reissue No.* 3,681, *dated October* 19, 1869.

IMPROVEMENT IN LOCKS.

The Schedule referred to in these Letters Patent and making part of the same.

*To all whom it may concern:*

Be it known that I, NECOLAS PETRÉ, of the city, county, and State of New York, have invented certain new and useful Improvements in Locks; and I do hereby declare the following to be a full, clear, and exact description of the same, reference being had to the accompanying drawings, making a part of this specification, in which—

Similar letters of reference, where they occur in the separate drawings, refer to like parts of the lock in all the figures.

Figure 1:
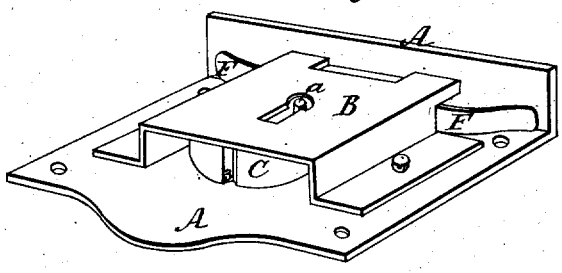
Figure 1 represents a perspective view of the exterior of the lock, taken from its back part or portion.
Figure 2:
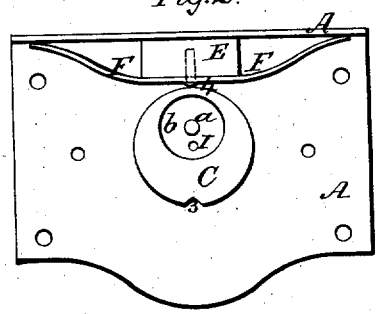
Figure 2 represents a plan view of the interior of the lock.
Figure 3:
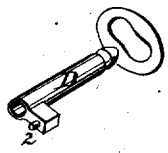
Figure 3 represents the key thereof.

This invention is represented as applied to what is known as drawer-locks; and

It consists in the combined use of a cam or eccentric, operated by a pin-key, and a bolt, with a spring interposed between the cam and the bolt, for drawing the bolt into the lock-case, when it is released from the pressure of the cam, and to prevent the cam and bolt from turning and moving, except when done by the key.

To enable others skilled in the art to make and use my invention, I will proceed to describe the same with reference to the drawings.

A represents the front plate of the lock, and B, the back plate, these two plates constituting the case or box of the lock.

A key-pin, *a*, is riveted, or otherwise fastened, to the lock-plate or frame, and upon this pin is eccentrically hung the hub, barrel, or block, C, of circular form, though acting as a cam or eccentric.

A circular recess, *b*, is countersunk in this hub C, in which the key D, when placed upon the key-pin *a*, can turn.

In the bottom of this recess or chamber, there is a hole, 1, into which the pin 2 on the key D enters, and by which said hub is turned around the key-pin.

E is the lock-bolt, to which, in the interior of the lock, is fastened a half-elliptic spring, F, which, by its reaction, draws the bolt within the lock-case, when the cam, which bears against said spring, is turned so as to release the spring.

In the edge or perimeter of the cam C there is a notch, 3, and on the spring F there is a projection, 4, which takes into said notch when the cam is turned around until it comes opposite to said notch, and when they are so engaged, both the cam and the bolt are frictionally locked together, and with sufficient firmness to hold them in the position they have been left in when the key is withdrawn from the lock.

The spring F, being of a semi-elliptic plate form, occupies but little space in the lock, and thus admits of its compactness of form, whilst it has all the force required for its purpose.

Coiled springs of any kind require more reactionary space for the exertion of a given force than the elliptic form does, making the latter very desirable where space is limited, and a lock required to occupy the least possible quantity of such space.

Having thus fully described my invention, I would state I am aware that a series of plates and toothed wheels and side cams have been used to throw out a lock-bolt which was retracted by a spring. This makes a very complicated and expensive lock, and I lay no claim to any such arrangement; but

What I claim herein as new, and desire to secure by Letters Patent, is—

In a lock, the combined use of a single cam turned by a pin-key, and a bolt, when a spring is so interposed between the cam and the bolt as to draw the latter within the case when unlocked, and to hold the cam and bolt together by frictional contact when locked, substantially in the manner herein described and represented.

NECOLAS PETRÉ.

Witnesses:
JOHN WALKER,
W. S. LIVINGSTON, Jr.